2,818,451

Patented Dec. 31, 1957

2,818,451
ISOMERIZATION OF AROMATIC HYDROCARBON

John W. Myers, Bartlesville, Okla., assignor to Phillips Petroleum Company, a corporation of Delaware No Drawing. Application June 14, 1954
Serial No. 436,707

13 Claims. (Cl. 260—668)

This invention relates to an improved process for the isomerization of aromatic hydrocarbons and to an improved catalyst therefor. A specific aspect of the invention pertains to the isomerization of xylenes.

The isomerization of aromatic hydrocarbons and particularly polyalkylbenzenes such as the xylenes in contact with catalysts has been practiced with considerable success. A silica-alumina catalyst is conventionally used in the isomerization of xylenes. The present invention is concerned with the use of an improved catalyst in the isomerization of polyalkylbenzenes which produces higher ultimate yield of the desired isomers.

The principal object of the invention is to provide an improved process for the catalytic isomerization of polyalkylbenzenes and an improved catalyst for this process. It is also an object of the invention to provide an improved process for the isomerization of xylenes, singly and in admixture. A further object of the invention is to provide a catalyst for the isomerization of polyalkylbenzenes which has higher efficiency and selectivity than conventional catalysts for this reaction. Other objects of the invention will become apparent from a consideration of the accompanying disclosure.

The broadest aspect of the invention comprises the isomerization of a polyalkylbenzene feed under isomerizing conditions with a catalyst comprising manganese oxide supported on an acidic type support comprising at least one member of the group consisting of silica, alumina, zirconia, magnesia, boria, titania, and HF-treated alumina. The preferred support is one containing silica-alumina. The general composition of the catalyst of the invention includes manganese oxide in the range of 0.5 to 20 weight percent and the balance a suitable support, such as silica-alumina, selected from the carriers listed above. Higher concentrations of manganese oxide may be utilized but are not particularly advantageous as compared with amounts in the range of 0.5 to 20 weight percent. In any event the carrier should comprise at least 50 weight percent of the catalyst. A preferred catalyst composition comprises 1–10 weight percent manganese oxide deposited on a silica-alumina support. A very effective xylene isomerization catalyst comprises 2 weight percent manganese oxide deposited on silica-alumina.

Various methods are described in the art for the preparation of silica-alumina which methods are generally applicable to the catalyst here involved. In general, silica-alumina type material is prepared by first forming a silica gel or jelly from sodium silicate or other alkali-metal silicate and an acid, washing soluble material from the gel, partially drying the gel, treating or activating the partially dried gel with an aqueous solution of a suitable aluminum salt, and subsequently washing and drying the activated material. In this manner, a part of the aluminum, presumably in the form of a hydrous oxide or loose hydroxide compound formed by hydrolysis, is selectively absorbed by the hydrous silica, and is not removed by subsequent washing. Another known method of preparing silica-alumina is to treat a wet or partially dried hydrous silica gel with an aluminum salt solution, such as a solution of aluminum chloride or sulfate, adding a basic precipitant, and subsequently washing and drying the treated material. Whether prepared by these methods or by some modification thereof, the carrier will preferably contain a major portion of silica and a minor portion of aluminum oxide. This minor portion of alumina will generally not be in excess of 20 percent by weight, and will more often, and generally more desirably, be in the range of 0.5 to 15 percent by weight, on the dry basis. Other methods of preparing the carrier are likewise known. However, the invention is not limited to any specific method for preparing the mixed silica-alumina carrier mass. The carrier of the present invention may be in the form of a fine powder, in the form of pellets or other formed pieces of suitable size, but pellets are the preferred form.

The manganese oxide may be incorporated by any suitable method such as impregnation or precipitation of a manganese compound, such as manganous carbonate. One satisfactory method is to impregnate silica-alumina pills with a solution of manganous nitrate, whereupon the nitrate is decomposed to the oxide by heating under conditions such that substantially all combined nitrogen oxides are removed.

The catalyst of the invention is particularly advantageous in the isomerization of xylenes, whether singly, or in admixture in concentrations substantially removed from the equilibrium concentration or composition of xylenes. Because of the demand for para-xylene in the manufacture of synthetic fibers, it is particularly desirable to utilize the catalyst of the invention to isomerize ortho- and/or meta-xylene to para-xylene. It is recognized, however, that the isomerization reaction involves the attainment of an equilibrium and that the process is also applicable to the isomerization of ortho- and/or para-xylene to meta-xylene and to the isomerization of meta- and/or para-xylene to ortho-xylene.

Although other sources of hydrocarbons may be utilized, the invention will be here described for purposes of simplicity in connection with petroleum hydrocarbon mixtures. In practicing the invention in its preferred embodiment, suitable hydrocarbon fractions for the production of the xylene isomers are obtained by aromatization, preferably utilizing the hydroforming process. This type of process is well known in the petroleum industry. However, because the chemistry involved and the mixtures obtained are extremely complex, careful coordination of feed stocks and hydroforming conditions is required in order to obtain best results and to yield a suitable xylene fraction for isomer recovery.

According to the process of the present invention, a xylene fraction generally comprising ortho-, meta-, and para-xylene, which may also contain some ethylbenzene, is contacted under isomerizing conditions with a catalyst comprising manganese oxide and silica-alumina prepared as described above.

Isomerization of the xylene fraction is carried out in the presence of the above-described catalysts at a temperature in the range of 600° F. to 1000° F., preferably 700° F. to 950° F., a pressure in the range of atmospheric to 1000 p. s. i. g., preferably atmospheric to 500 p. s. i. g., and a liquid hourly spaced velocity in the range of 0.3 to 10, preferably 0.5 to 6. It has been found that it is possible to obtain high yields of para-xylene in the isomerization zone without introducing hydrogen. However, if it is desired, hydrogen in a mol ratio of hydrogen to hydrocarbon up to 20:1 can be used. The operating conditions set forth herein for xylenes are also applicable to the isomerization of the polyalkylbenzenes as a class, In a specific embodiment, a xylene concentrate, such as that prepared by concentrating the xylenes and ethylbenzene produced in a reforming process using a platinum-HF-treated-alumina catalyst, is fed to a fractional crystallization zone, wherein para-xylene is separated in crystalline form from a xylene concentrate. The crystallization temperature ordinarily runs in the range of about −70 F. to −115° F., depending on the composition of the feed and the desired approach to the eutectic temperature. A stream comprising the mother liquor and, if utilized, the internal reflux material, or other reflux material, is removed from the crystallization zone and passed to the isomerization zone. The isomerization zone catalyst is prepared for use in a manner as set forth above. Conditions of operation are also those as set forth above. In the isomerization zone, the xylenes undergo carbon skeleton isomerization in which the ortho- and meta-xylenes are converted in part to para-xylene. If desired, following the isomerization of ortho- and meta-xylene to para-xylene, the product may be subjected to fractional distillation to remove toluene and $C_9$ and heavier aromatic hydrocarbon fractions therefrom leaving a product enriched in para-xylene from which the para-xylene may be subsequently separated by returning this fraction to the fractional crystallization zone along with the xylene concentrate feed.

The following example is presented to illustrate the invention and is not to be interpreted as placing unnecessary limitations on the scope of the invention.

EXAMPLE

A series of runs were made in which a xylene concentrate was passed over different catalysts and the data obtained are presented in Table I.

The catalyst used in run No. 1 was a commercial catalyst containing approximately 90 percent $SiO_2$ and 10 percent $Al_2O_3$.

The catalyst used in run No. 2 was a manganese oxide on silica-alumina catalyst. It was prepared by impregnating silica-alumina pills with a manganous nitrate solution to give a catalyst containing about 2 weight percent manganese oxide. A manganous nitrate solution was made up by diluting 15.1 grams of 50 percent manganous nitrate solution with distilled water to 100 ml. Then 75.6 grams of silica-alumina pills were added to the solution. The excess solution was then drained off and the impregnated pills were then calcined by placing them in a muffle furnace at room temperature, and then heating rapidly to 750° F. and holding the pills at this temperature for 12 hours.

The catalyst used in run No. 3 was prepared as follows: Two liters of silica-alumina pills were impregnated by immersing in two liters of 0.78 molar $CrO_3$ solution. After standing for about 10 minutes, the excess solution was drained off, the pills were dried at 100° C. and then heated to 950° F. The catalyst was used in two tests before the one shown here and was regenerated after each of these runs with air-$N_2$ at about 950° F. Composition 3.5 weight percent chromia on silica-alumina.

The silica-alumina pills used in making the catalysts used in runs Nos. 2 and 3 were taken from the same batch of pills as those of run No. 1.

The catalyst of runs No. 4 and No. 5 was a commercial catalyst of the composition, 9 weight percent molybdena—91 alumina.

The catalyst of run No. 6 was a commercial catalyst of the composition, 9.5 weight percent molybdena—3 weight percent cobalt oxide—balance alumina. Method of preparation was unknown.

Table I

| Catalyst | Feed | $SiO_2$-$Al_2O_3$ | 2% $MnO_2$ on $SiO_2$-$Al_2O_3$ | Chromia-silica-alumina | Molybdena-alumina | | Cobalt molybdate-alumina |
|---|---|---|---|---|---|---|---|
| Run No. | | 1 | 2 | 3 | 4 | 5 | 6 |
| Experimental conditions: | | | | | | | |
| Temp., °F | | 757 | 752 | 756 | 885 | 871 | 898 |
| Press., p. s. i. a. | | 15 | 15 | 15 | 215 | 265 | 265 |
| LHSV | | 1.10 | 0.99 | 0.9 | 1.1 | 1.2 | 1.0 |
| Length of run, hr | | 2.3 | 1.8 | 2.2 | 1.6 | 2.9 | 2.1 |
| $H_2$/HC, mol | | 0.0 | 0.0 | 0.0 | 2.9 | 0.5 | 2.7 |
| Products, wt. percent: | | | | | | | |
| $C_1$-$C_5$ | | 0.1 | 0.1 | 0.1 | 2.2 | 0.6 | 9.8 |
| Benzene | | 1.8 | 0.4 | 0.5 | 0.5 | 0.0 | 1.3 |
| Toluene | 2.9 | 6.4 | 5.6 | 4.0 | 6.9 | 4.7 | 18.6 |
| p-Xylene | 6.7 | 14.0 | 13.3 | 7.0 | 7.6 | 6.8 | 9.1 |
| m-Xylene | 42.4 | 34.8 | 36.6 | 41.0 | 39.8 | 40.8 | 28.8 |
| o-Xylene | 22.9 | 15.9 | 17.7 | 21.2 | 20.4 | 19.0 | 13.6 |
| Ethylbenzene | 24.4 | 21.1 | 22.3 | 23.0 | 19.2 | 23.2 | 11.0 |
| Heavier than xylenes | 0.7 | 5.7 | 3.9 | 2.1 | 3.4 | 3.6 | 7.4 |
| Coke | | 0.2 | 0.1 | 1.1 | (a) | 1.3 | 0.4 |
| Total | 100.0 | 100.0 | 100.0 | 100.0 | 100.0 | 100.0 | 100.0 |
| Calculated ultimate yield | | 40.7 | 50.4 | | | | | a Coke was not determined.

Although the p-xylene was 0.7 percent lower with the manganese-containing catalyst (comparing run No. 2 with run No. 1), the m-xylene and o-xylene were each 1.8 percent higher. Thus it is apparent that the efficiency of isomerization was higher with the manganese-containing catalyst. Runs 3 to 6, inclusive, offer a comparison of commercial hydroforming and/or reforming catalysts with the catalysts of runs Nos. 1 and 2. These data demonstrate the relative inefficiency of chromia-silica-alumina, molybdena-alumina, and cobalt molybdate-alumina in the isomerization of xylenes.

Certain modifications of the invention will become apparent to those skilled in the art and the illustrative details disclosed are not to be construed as imposing unnecessary limitations on the invention.

I claim:

1. A process which comprises isomerizing at least one polyalkylbenzene containing a maximum of 4 alkyl groups per molecule and a maximum of 2 carbon atoms per group in contact with a catalyst comprising essentially manganese oxide in admixture with at least one member of the group consisting of silica, alumina, zirconia, magnesia, boria, titania, and HF-treated alumina under isomerizing conditions.

2. The process of claim 1 wherein a minor proportion of manganese oxide is deposited upon a carrier comprising principally silica-alumina.

3. The process of claim 2 wherein the manganese oxide is in the range of 0.5 to 20 weight percent of the catalyst composite and the balance is silica-alumina.

4. The process of claim 1 wherein the manganese oxide is in the range of 0.5 to 20 weight percent of the catalyst composite.

5. The process of claim 1 wherein isomerizing conditions include a temperature in the range of 600 to 1000° F. and a pressure in the range of atmospheric.

6. The process of claim 5 wherein the catalyst consists essentially of manganese oxide in the range of 0.5 to 20 weight percent and silica-alumina.

7. A process for isomerizing a hydrocarbon feed comprising at least one xylene which comprises contacting said feed with a catalyst comprising manganese oxide and at least one member of the group consisting of silica, alumina, zirconia, magnesia, boria, titania, and HF-treated alumina under isomerizing conditions so as to isomerize said xylene.

8. A process for isomerizing a hydrocarbon feed comprising at least one xylene which comprises contacting said feed with a catalyst comprising manganese oxide in the range of 0.5 to 20 weight percent deposited on a carrier comprising essentially silica-alumina under isomerizing conditions so as to isomerize said xylene.

9. The process of claim 8 wherein said feed comprises principally o-xylene.

10. The process of claim 8 wherein said feed comprises principally m-xylene.

11. The process of claim 8 wherein said feed comprises principally p-xylene.

12. The process of claim 8 wherein said feed comprises a mixture of xylenes substantially removed from equilibrium concentration.

13. The process of claim 8 wherein said feed comprises a mixture of o-, m-, and p-xylene in which the p-xylene is in less than equilibrium concentration.

References Cited in the file of this patent

UNITED STATES PATENTS

| | | |
|---|---|---|
| 2,403,757 | Reeves | July 9, 1946 |
| 2,479,110 | Haensel | Aug. 16, 1949 |
| 2,532,276 | Birch et al. | Dec. 5, 1950 |
| 2,617,169 | Bodkin | Nov. 11, 1952 |
| 2,632,779 | Pfennig | Mar. 24, 1953 |